United States Patent [19]
Renger

[11] Patent Number: 4,659,532
[45] Date of Patent: Apr. 21, 1987

[54] INTERNAL DUSTING OF FILM TUBES COMPOSED OF THERMOPLASTICS

[75] Inventor: Wolfgang Renger, Bomlitz-Bommelsen, Fed. Rep. of Germany

[73] Assignee: Wolff Walsrode AG, Walsrode, Fed. Rep. of Germany

[21] Appl. No.: 760,375

[22] Filed: Jul. 30, 1985

[30] Foreign Application Priority Data

Aug. 16, 1984 [DE] Fed. Rep. of Germany ....... 3429963

[51] Int. Cl.$^4$ ............................................. B29C 47/88
[52] U.S. Cl. ..................... 264/518; 264/558; 264/559; 264/562; 264/130; 264/131; 425/71; 425/94; 425/97; 425/104; 425/326.1
[58] Field of Search ............... 264/558, 130, 131, 559, 264/562, 518; 425/71, 94, 326.1, 97, 104

[56] References Cited

U.S. PATENT DOCUMENTS

| | | | |
|---|---|---|---|
| 2,488,571 | 11/1949 | Trull | 264/559 |
| 2,541,064 | 2/1951 | Irons | 264/559 |
| 2,634,459 | 4/1953 | Irons | 264/564 |
| 3,260,776 | 7/1966 | Lindstrom, Jr. et al. | |
| 3,280,233 | 10/1966 | Wiggins | 264/559 |
| 4,048,428 | 9/1977 | Baird, Jr. et al. | 264/559 |

FOREIGN PATENT DOCUMENTS

| | | | |
|---|---|---|---|
| 18167 | 10/1980 | European Pat. Off. | |
| 41-8871 | 5/1966 | Japan | 264/559 |
| 849070 | 9/1960 | United Kingdom | |

Primary Examiner—Jeffery Thurlow
Attorney, Agent, or Firm—Sprung Horn Kramer & Woods

[57] ABSTRACT

A process for providing film tubes with anti-blocking means in that the film tube is cooled internally by an aqueous suspension containing a suspended release agent directly after extrusion, the excess suspensions are sucked from the interior and the tube, which is additionally cooled on the exterior in a water bath, is freed of remaining liquid by squeezing rollers.

10 Claims, 1 Drawing Figure

INTERNAL DUSTING OF FILM TUBES COMPOSED OF THERMOPLASTICS

BACKGROUND OF THE INVENTION

1. Field of the Invention

The present invention relates to a process for providing thermoplastic film tubes with anti-blocking means directly during their production by cooling the film tube in its interior with an aqueous release agent suspension directly after extrusion.

2. Background Information

Film tubes composed of thermoplasts, preferably polyvinylidene chloride (PVDC), have a tendency to block owing to their smooth surfaces. The tubes can therefore be opened only by means of adhesive tape, for example for filling.

Tubes composed of thermoplastics are usually produced in such a way that the thermoplastic material is extruded by means of a tubular die and is subsequently cooled internally and externally in a water bath. A water-oil emulsion is generally used as an internal coolant. Although this emulsion prevents the insides of the tube from sticking together directly after extrusion, it cannot prevent blocking of the final tube. Attempts have therefore been made to overcome this problem by applying an anti-blocking agent to the interior of the finished tube.

According to the teaching of EP No. 0018167, this is achieved in an additional operation in which an anti-blocking agent is supplied to the interior of a moving film tube from a storage container arranged in the interior and dispersed by centrifugal force.

In the past, however, it has not been possible to provide such tubes with anti-blocking agents directly during production.

SUMMARY OF THE INVENTION

This is achieved according to the subject invention by cooling the interior of the film tube with an aqueous suspension containing a suspended release agent directly after extrusion of the tube, sucking the excess suspensions from the interior and freeing the tube, which is additionally cooled on its exterior in a water bath, from remaining liquid using squeezing rollers.

DETAILED DESCRIPTION OF THE INVENTION

Figure 1:
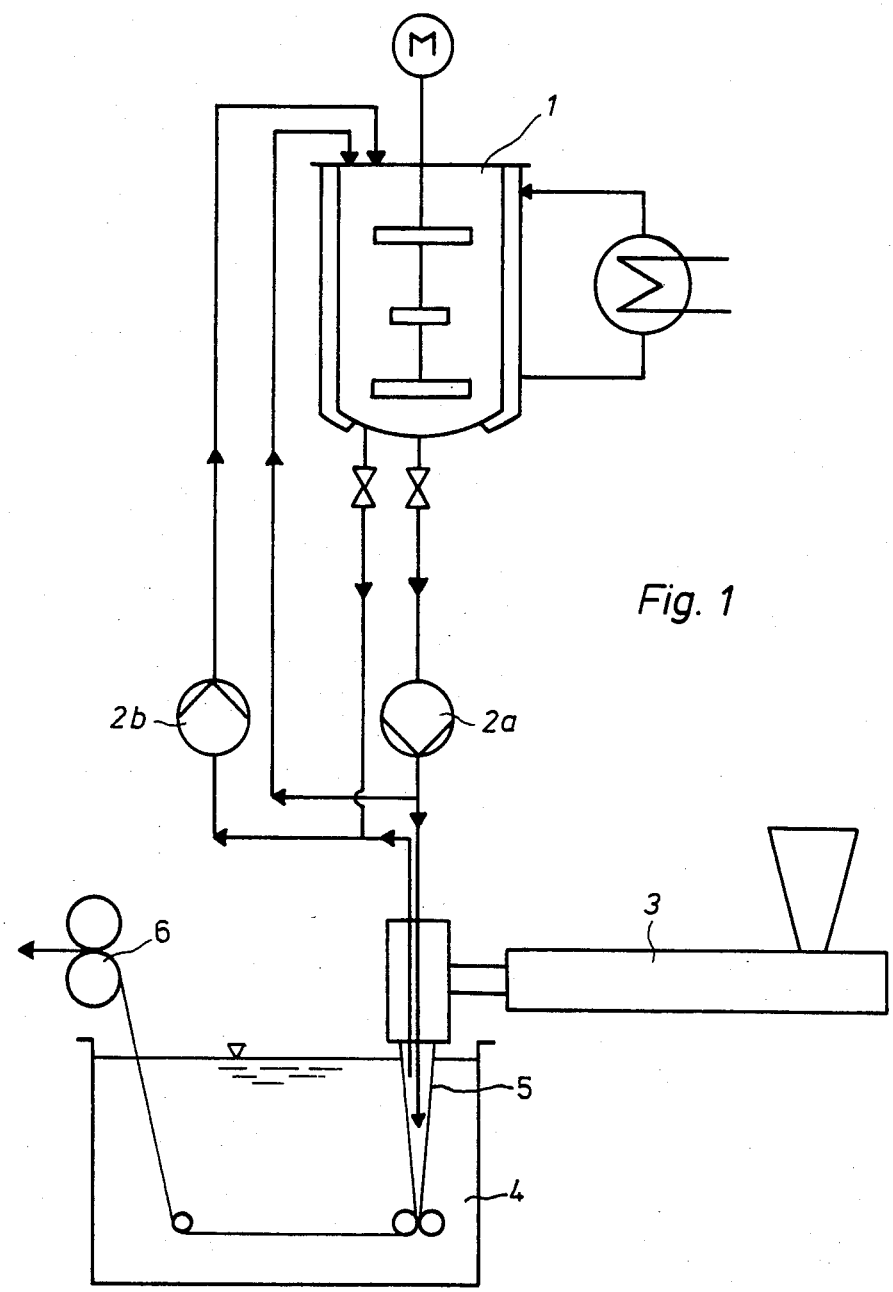
FIG. 1 is a schematic diagram depicting a process according to the present invention.

The process according to the invention for producing anti-blocking film tubes composed of thermoplastic resin, preferably of PVDC, can preferably be carried out according to the diagram shown in FIG. 1. In this case, the anti-blocking agent suspension is placed in a double-walled container 1 with constant stirring. The suspension in the container 1 can be cooled in order to keep the temperature of the suspension constant during production and to allow uniform quenching of the extrudate. The suspension is conveyed through a tubular die of the extruder 3 into the nearly molten tube 5 by means of a pump 2a. A second pump 2b simultaneously sucks out the excess suspension. The substantially molten tube is cooled externally in a water bath 4 and internally by means of the suspension. By means of squeezing rollers 6 the water and anti-blocking agent are separated from one another.

Thereby it has surprisingly been found that the anti-blocking agent present in the suspension adheres uniformly on the internal surface of the tube and therefore serves as a subsequent opening aid. The powder does not have an adverse effect on subsequent processing.

The aqueous suspension contains conventional release agents in finely divided form such as talc, $CaCO_3$ or $SiO_2$ with an average particle diameter of from 1 to 30 $\mu$m, preferably 5 to 20 $\mu$m. In addition to 20 to 60, preferably 30 to 40, parts by weight of powder, the suspension can also contain known suspension auxiliaries such as sorbitane monooleate, glycerine monosterate or sorbitane monopalmitate.

The suspensions are fed into the interior of the film tube which is still substantially molten at a rate of 0.05 to 0.8 l/min, preferably 0.15 to 0.5 l/min.

EXAMPLE

PVDC containing conventional additives is melted in an extruder at 153° C. The melt is extruded through a tubular die ($\phi$ 47/50 mm) to form a tube and is conveyed into a water bath. The temperature of the water bath is 20° C. The tube is cooled internally by a suspension which contains the anti-blocking agent and is pumped from a supply container into the interior of the tube. The suspension has the following composition:

72% by weight of water
27.8% of $CaCO_3$ powder of average particle diameter 10 $\mu$m
0.2% by weight of sorbitanemonolaurate.

The suspension is circulated below the die inside the tube by means of a pumping system. The tube is flattened and the water squeezed out in a subsequent squeezing operation.

The tube can be opened easily and does not block even during prolonged continuous production. Measurement of the quantity of powder applied demonstrates a homogeneous distribution of powder.

| Measurement after x(m) of tube production | Quantity of powder applied in g/m² |
| --- | --- |
| 100 | 0.32 |
| 200 | 0.33 |
| 300 | 0.29 |
| 400 | 0.30 |
| 500 | 0.32 |
| 600 | 0.32 |
| 700 | 0.29 |
| 800 | 0.33 |
| 900 | 0.31 |
| 1000 | 0.30 |

I claim:

1. A process for producing anti-blocking film tubes composed of thermoplastic resin, wherein the tube which is still substantially molten is cooled internally with an aqueous suspension containing an anti-blocking agent directly after its extrusion, the suspension is subsequently sucked from the interior of the tube, and the tube which is additionally cooled on its exterior in a water bath is freed from remaining fluid using squeezing rollers.

2. A process according to claim 1, wherein the thermoplastic material is polyvinylidene chloride.

3. A process as claimed in claim 1, wherein the suspension contains 20 to 60 parts by weight of the antiblocking agent.

4. A process as claimed in claim 1, wherein the suspension contains 30 to 40 parts by weight of the antiblocking agent.

5. A process as claimed in claim 1, wherein the antiblocking agent is selected from the group consisting of talc, $CaCO_3$ and $SiO_2$.

6. A process as claimed in claim 1, wherein the suspension is fed into the tube at a rate of from 0.05 to 0.8 l/min.

7. A process as claimed in claim 1, wherein the suspension is fed into the tube at a rate of from 0.15 to 0.5 l/min.

8. A process as claimed in claim 1, wherein the antiblocking agent has an average particle diameter of 1 to 30 μm.

9. A process as claimed in claim 1, wherein the antiblocking agent has an average particle diameter of 5 to 20 μm.

10. A process as claimed in claim 1, wherein the suspension further comprises a suspension auxiliary selected from the group consisting of sorbitane monooleate, glycerine monostearate and sorbitane monopalmitate.

* * * * *